United States Patent [19]

Ban et al.

[11] 4,213,535
[45] Jul. 22, 1980

[54] FLUID RESERVOIRS FOR MASTER CYLINDERS

[75] Inventors: Masashi Ban; Tomio Tachino, both of Kariya; Jiro Kizaki, Toyota, all of Japan

[73] Assignees: Aisin Seiki Kabushiki Kaisha, Kariya; Toyota Jidosha Kogyo Kabushiki Kaisha, Toyota, both of Japan

[21] Appl. No.: 929,177

[22] Filed: Jul. 28, 1978

[30] Foreign Application Priority Data

Jul. 30, 1977 [JP] Japan ............................ 52-102775[U]

[51] Int. Cl.³ ...................... B65D 85/00; B65D 1/24
[52] U.S. Cl. ..................................... 220/20.5; 220/3.3
[58] Field of Search .................. 220/20, 20.5, 18, 69, 220/70, 85 B, 74, 327, 435, 445, 446, 85 K, 94 R, 3.3, 3.5; 60/477; 188/345, 352; D12/180

[56] References Cited

U.S. PATENT DOCUMENTS

| | | | |
|---|---|---|---|
| 2,284,466 | 5/1942 | Zelt | 220/3.3 X |
| 3,173,265 | 3/1965 | Bixby | 220/85 B X |
| 4,026,319 | 5/1977 | Pickering | 188/345 X |

FOREIGN PATENT DOCUMENTS

| | | |
|---|---|---|
| 1024596 | 3/1966 | United Kingdom . |
| 1096007 | 12/1967 | United Kingdom . |
| 1164070 | 9/1969 | United Kingdom . |
| 1236556 | 6/1971 | United Kingdom . |
| 1245126 | 9/1971 | United Kingdom . |
| 1293103 | 10/1972 | United Kingdom . |
| 1311226 | 3/1973 | United Kingdom . |
| 1447126 | 8/1976 | United Kingdom . |
| 1472814 | 5/1977 | United Kingdom . |

Primary Examiner—Steven M. Pollard
Attorney, Agent, or Firm—Finnegan, Henderson, Farabow, Garrett & Dunner

[57] ABSTRACT

A fluid reservoir for a master cylinder has intergral flanges at the rear and front portions thereof which are able to absorb expansion and contraction due to the change in the surrounding temperature.

2 Claims, 3 Drawing Figures

FLUID RESERVOIRS FOR MASTER CYLINDERS

This invention relates to fluid reservoirs for master cylinders, and more particularly to improvements in the connections joining reservoirs and master cylinders for use in the hydraulic brake systems of vehicles.

In order to compensate for losses of fluid in a hydraulic brake system and receive fluid return when the brake is released, a vehicle brake master cylinder assembly having a fluid reservoir connectable to a master cylinder is widely used in vehicle braking systems. The reservoir is generally provided at the rear and front portions thereof with two flanges which extend horizontally and longitudinally and have slots, and are rigidly connected to the master cylinder body by bolting the flanges so that fluid chambers of the reservoir are satisfactorily linked with the chambers of the master cylinder body.

Recently, in order to reduce the weight of the vehicle brake master cylinder assembly, the reservoir portion thereof has been made of a synthetic resin material, such as polypropylene or polyamide. However, the master cylinder portion has to be made of a metal such as cast iron or aluminum, and the two portions have different coefficients of thermal expansion. Due to the difference of their coefficients of thermal expansion, it is difficult to maintain an unbroken connection between the reservoir and cylinder body portions. When the temperature surrounding the master cylinder rises, the reservoir made of the resin material, having a relatively high coefficient of thermal expansion, will expand at a greater rate than the metal master cylinder and this will result in deformation of the connecting portions of the reservoir and the master cylinder. If the flanges for connecting the reservoir and the master cylinder body are deformed repeatedly in the direction of expansion and a great deal of thermal stress is generated at the connecting portions, they tend to break down earlier than desirable. Thus, it is understood that the prior configurations of the flanges are not ideal for use in joining the reservoir and the master cylinder body. Particularly, in case of the reservoir for a tandem master cylinder having two fluid chambers disposed along the length of the cylinder, the longitudinal length of the reservoir is longer than that of a single chamber type reservoir and thus there is a larger amount of longitudinal expansion of the reservoir. The prior configuration of the flange makes it difficult to provide a useful span of life thereof.

It is thus a primary object of the present invention to provide a reservoir for a master cylinder which has a prolonged useful life and overcomes the drawbacks mentioned above.

Another object of the present invention is to provide a reservoir for a master cylinder which has an unique configuration of flanges for reliably connecting the reservoir to the master cylinder body.

Still another object of the present invention is to provide a reservoir for a master cylinder which has flanges provided at the rear and front portions of the reservoir that are capable of absorbing the thermal expansion of the reservoir.

A still further object of the present invention is to provide a reservoir for a master cylinder which has a pinched in portion in the body of the reservoir and flanges which facilitate the absorption of thermal expansion and contraction thereof.

Other objects and advantages of the invention will become apparent from the following description of the preferred embodiment with reference to accompanying drawings in which.

Figure 1:
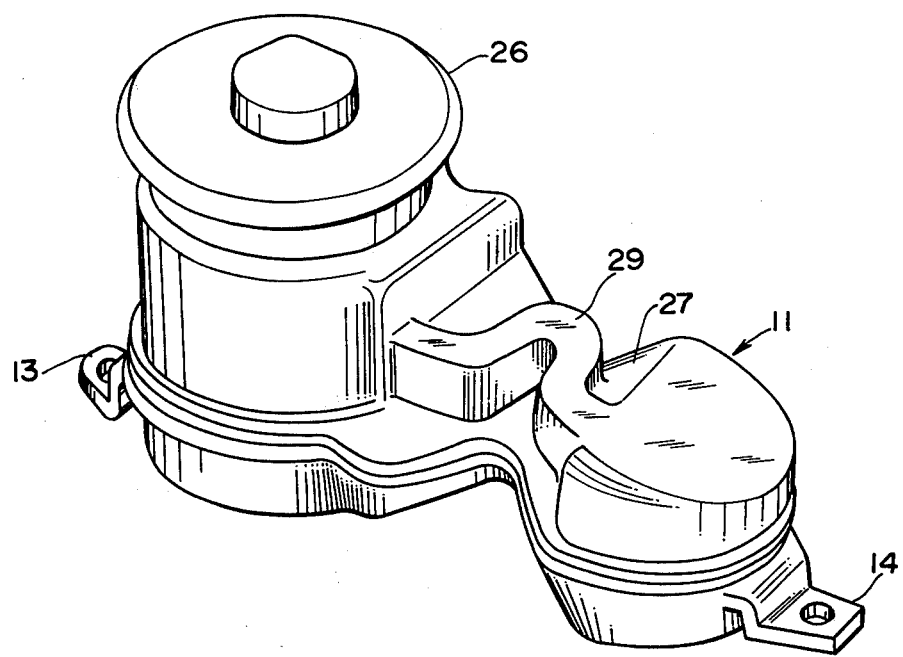
FIG. 1 is a perspective view of an embodiment of a fluid reservoir for a tandem master cylinder in accordance with the present invention.
Figure 2:
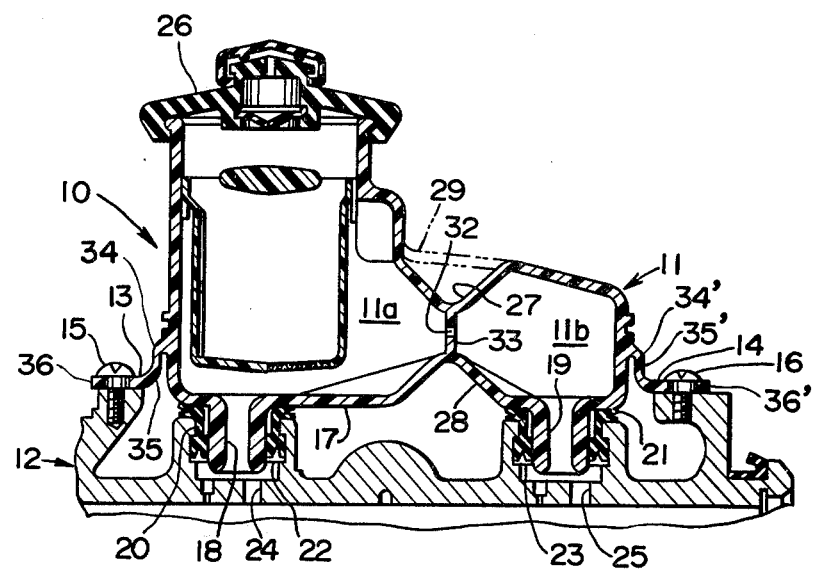
FIG. 2 is a longitudinal section of the reservoir shown in FIG. 1.

Referring to FIGS. 1 and 2, a reference numeral 10 designates a tandem master cylinder assembly for a vehicle brake system, and the cylinder and piston means of the assembly will not be described, since they are not essential portions of the present invention. The assembly 10 comprises a fluid reservoir 11 made of polypropylene and a cylinder body 12 made of a metal. The reservoir 11 has formed therein two fluid chambers 11a, 11b for containing a hydraulic fluid which is, in use, supplied into the cylinder body 12 to operate the associated brake. Furthermore, the reservoir 11 is formed with a pair of flange portions 13, 14 at its longitudinally opposite ends which are fixed by bolts 15, 16 to adjacent flange portions, respectively, of the cylinder body 12, so that the chambers 11a, 11b are positioned along the length of the cylinder body 12.

The flanges (13, 14) formed integral with the body of the fluid reservoir (11) are composed of first portions (34, 34') longitudinally extending from the body of the reservoir (11), second portions (35, 35') downwardly extending from the first portions and third portions (36, 36') having slots or holes for receiving the bolts (15, 16) and horizontally extending from the second portions as seen in FIG. 2. These flanges are flexible enough to absorb the thermal expansion or contraction of the reservoir (11) so that upward and downward and longitudinal deformations thereof are absorbed without any adverse effects on the flanges and without generating a great deal of thermal stress at the connecting portions of the outer wall of the chambers (11a, 11b) and the flanges (13, 14). In general, the reservoir (11) for the tandem master cylinder having the two fluid chambers (11a, 11b) may be disposed along the length of the cylinder and the longitudinal length of the reservoir becomes longer. Further, as the flanges provided at the rear and front portions of the reservoir are secured to the metal body of the master cylinder (12), a large amount of thermal deformations of the reservoir (11) in longitudinal, upward and downward directions take place and the thermal stress is centered on the flange portions. However, since the reservoir according to the present invention is provided at the rear and front portions with the flanges having bendable portions, the thermal expansion or contraction of the reservoir is able to be absorbed by the bendable portions of the flanges.

A lower wall 17 of the reservoir 11 is integrally provided with a pair of downward cylindrical extensions 18, 19 which are in fluid-tight connection by means of seal members 20, 21 with cavities 22, 23, respectively, of the cylinder body 12. The bottom walls of the cavities 22, 23 are formed with holes 24, 25 through which the cavities are linked with the first and second operating chambers, respectively, defined within the cylinder body. With such arrangement, the fluid within chamber 11a can be directed to the first operating chamber of the cylinder body 12 by way of the cavity 22 and the hole 24, and the fluid within the chamber 11b can also be directed to the second operation chamber of the cylinder body 12 through the cavity 23 and the hole 25.

The reservoir is provided at an upper portion of the chamber 11a with an opening for supplying an additional amount of the fluid thereinto and which is closed by a detachable cap 25 suitably formed of rubber. Furthermore, the intermediate portions of the flange portions 13, 14 are so shaped as to provide flexibility in the flange portions.

At the portion communicating between the chambers 11a and 11b of the reservoir 11, the upper and lower walls thereof are formed to have inwardly tapered portions 27, 28 as clearly shown in section in FIG. 2. Similarly, the opposite side walls of the reservoir are also formed at that portion thereof to have inwardly tapered portions 30, 31 as clearly shown in FIG. 3. In this manner, a laterally reduced area is formed within the interior of the reservoir between the chambers 11a and 11b. A partition 33 is provided in the laterally reduced area to divide the chambers from each other. The partition is formed with a through hole 32 which serves to link the chambers 11a and 11b to allow a restricted flow of the fluid from one of the chambers to the other chamber.

The two fluid chambers (11a, 11b) may be said to resemble an hour glass with a connecting partition (33) at the pinched-in waist.

Figure 3:
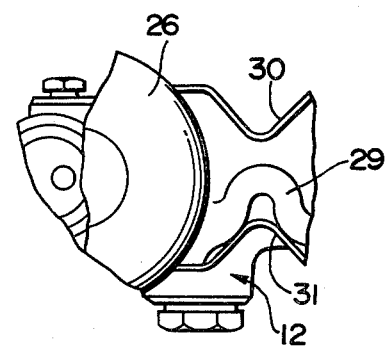
FIG. 3 is a fragmentary plan view of a part of the reservoir of FIG. 1.

The upper portions of the chambers (11a, 11b) are linked to each other by a curved passage 29 provided in the U-shaped portion as seen in FIG. 3, so that when an additional amount of fluid is supplied from the upper opening of chamber 11a into the reservoir 11, air existing in the upper portion of the chamber 11b is displaced through the passage 29 to the chamber 11a so that chamber 11b can be filled with the fluid.

With this arrangement, when the ambient temperature rises the reservoir commences to thermally expand at a relatively larger rate than the metal cylinder thereby tending to cause the outward deformation of the reservoir. Because of the provision of the bendable flanges and the pinched-in configuration of the reservoir, however, the longitudinally outward deformation or expansion of the reservoir is substantially absorbed by the bendable flanges and the tapered portions 27, 28, 30 and 31, so that the flange portions are not damaged and a good fluid-tight connection between the cylindrical extensions 18, 19 and the cavities 22, 23 is maintained.

It will further be understood that a similar effect is brought forth by the above-described arrangement upon the contraction of the reservoir due to the lowering of the ambient temperature. In this case, however, the longitudinal deformation of the reservoir is also absorbed by the bendable flanges and the pinched-in portions thereof.

Furthermore, the curved configuration of the passage 29 of the reservoir permits the smooth deformation of the pinched-in portions in response to the thermal stress caused in the reservoir.

We claim:

1. In a fluid reservoir formed of resin material for attachment to a metal master cylinder, the improvement comprising a pair of flanges integral with said reservoir for securing said reservoir to said master cylinder, one of said flanges being formed at each opposed end of said reservoir substantially parallel to its longitudinal axis, each said flange having a first portion longitudinally extending from the peripheral wall of said reservoir, a second portion downwardly extending from said first portion and being spaced from the peripheral wall of said reservoir, and a third portion horizontally extending from said second portion and defining means for securing said reservoir to said master cylinder, each said flange being bendable for compensating for stresses imposed by differences in thermal expansion of said reservoir and said master cylinder.

2. A fluid reservoir for attachment to a master cylinder according to claim 1 wherein said means for securing said reservoir is a hole and wherein said reservoir is secured to the body of said master cylinder by a bolt passing through said hole.

* * * * *